UNITED STATES PATENT OFFICE.

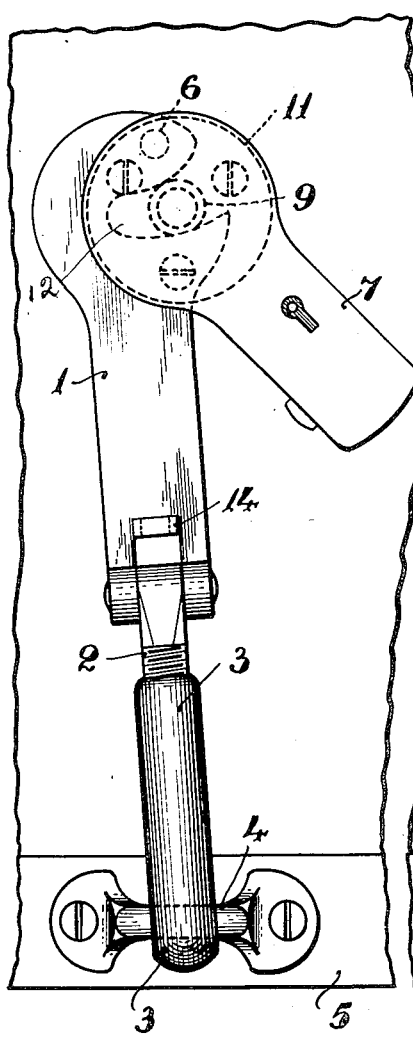
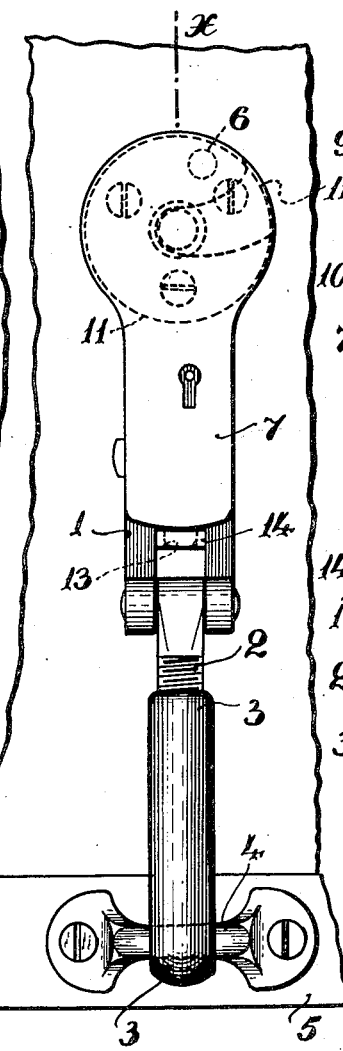
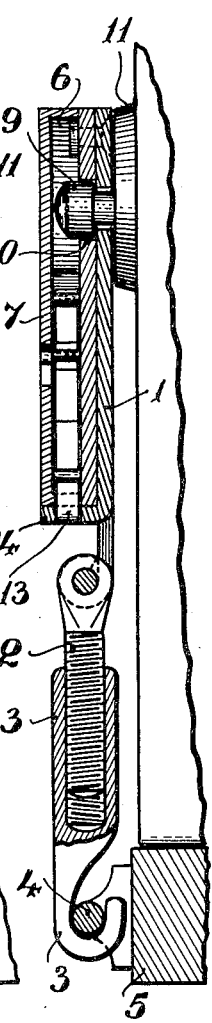

ALEXANDER HUGH JENKINS, OF BIRMINGHAM, ENGLAND, ASSIGNOR TO J. B. BROOKS AND COMPANY LIMITED, OF BIRMINGHAM, ENGLAND.

FASTENING OR SECURING DEVICE.

1,346,655.  Specification of Letters Patent.  Patented July 13, 1920.

Application filed October 16, 1919. Serial No. 331,204.

*To all whom it may concern:*

Be it known that I, ALEXANDER HUGH JENKINS, subject of the King of Great Britain, residing at Birmingham, England, have invented certain new and useful Improvements in Fastening or Securing Devices, of which the following is a specification.

This invention relates to fastening or securing devices for various purposes, but principally for securing trunks, boxes and the like upon the roofs, carrier-grids, or other parts of motor-cars or for fastening the lids of boxes, trunks, wallets, bags and the like to the bodies of such articles; said fastening or securing devices being of that type in which the parts to be fastened are drawn tightly together by means of a lever attached to one of the parts to be secured and having pivoted to it, at a point situated eccentrically with respect to the fulcrum, a link or hook member adapted to turn in a plane parallel to that of the lever, the outer end of the said member being engaged or connected to the other part to be secured.

The principal object of the present invention is to provide an improved construction of this type of fastener which is adapted to be held perfectly secure when fastened, and proof against unauthorized opening. A further object is to simplify the construction and render the fastening more efficient and easier to operate.

According to the invention, the lever carries a key-operated lock the bolt of which, when the fastener is closed, engages with a suitable part of the member to which the lever is pivoted, so that the fastener can only be released by withdrawing the bolt by means of a key. The lever has a hole in its underside detachably engaging a necked stud on the one part to be secured, and is locked thereto, when the fastener is closed, by a slot in the other member engaging the said neck of the stud, the width of the slot being less than the diameter of the head.

Figure 1 of the accompanying drawings represents an elevational view of a fastener constructed in accordance with this invention and shown as used for connecting a trunk to the luggage grid of a motor-car, the fastener being represented before the lever member has been turned down about its pivot so as to draw the trunk tightly on to the grid of the car.

Fig. 2 is an elevational view showing the lever member turned down and locked to the link member of the fastener.

Fig. 3 is longitudinal section on line $x$, Fig. 2.

Referring to the drawings, the improved fastener comprises a plate or link member 1 carrying at its lower end a hinged depending screw-bolt 2 upon which is adjustably screwed a long nut or internally screw-threaded sleeve 3 provided at its lower extremity with a hook adapted to engage a bar or staple 4 carried by the grid 5.

Pivoted at 6 to the upper end of the front of the link or plate 1, toward one side thereof, is a lever member 7 which carries upon its front face a casing or box-like housing containing a key-operated lock. This lever member is provided with a circular hole 9 near its upper end which can be engaged with a necked stud 10 on an attachment plate 11 adapted to be secured to the trunk, so that the said stud 10 protrudes into the upper end of the lock casing as far as the front plate thereof. The link member 1 of the fastener is provided in one side with a curved slot 12 adapted to engage with the neck of the stud 10, the width of the slot being less than the diameter of the head of the stud. When the lever member 7 is turned down to draw the trunk tightly on to the grid 5 as shown in Fig. 3, the slot 12 in the link 1 engages the stud 10, the pivot 6 between the link 1 and lever member 7 moving beyond the vertical center line through the stud. The stud 10 is thus locked to the lever 7 by the slotted link 1, and as the lever 7 reaches its vertical position the bolt 13 of the lock is engaged with a staple 14 on the link member, so that the fastener is securely locked, and can only be released by unfastening the lock by means of a key. The staple 14 is preferably formed by stamping up a tongue of metal at right-angles to the link 1, and providing same with a suitable opening for engagement by the bolt 13 of the lock.

The bolt may be spring-actuated, or may be operated by a key both for locking and unlocking.

The application of the invention to the fastening of trunks to one another, or for fastening the lids of boxes, cases and the like differs in no essential respect from the arrangement described above.

Having fully described my invention, what I desire to claim and secure by Letters Patent is:—

1. A fastening or securing device comprising a link member adapted to be attached at one end to one of the members to be secured; a staple secured to said link, means for adjusting the length of said link, a lever member eccentrically pivoted to the link member so as to turn in a plane parallel to that of the latter; and a lock combined with and forming an integral part of the lever member and adapted to coöperate with the staple carried by said link member to secure the latter to the link member after the parts have been drawn together.

2. A fastening or securing device comprising a link member adapted to be attached at one end to one of the members to be secured and provided at its opposite end with a curved slot, a necked stud upon the other member to be secured and adapted to engage said curved slot in the link member, a lever member eccentrically pivoted to the link member so as to turn in a plane parallel to that of the latter, said lever member being formed with an opening in its rear face adapted to engage with the necked stud; and a lock combined with and forming an integral part of the lever member and adapted to secure the latter to the link member after the parts have been drawn together.

In testimony whereof I have hereunto set my hand in presence of two subscribing witnesses.

ALEXANDER HUGH JENKINS.

Witnesses:
H. N. Skerrett,
W. S. Skerrett.